US008928534B2

(12) United States Patent
Ide

(10) Patent No.: US 8,928,534 B2
(45) Date of Patent: Jan. 6, 2015

(54) ELECTRONIC APPARATUS AND METHOD FOR MAKING THE SAME

(75) Inventor: Yoshiyuki Ide, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 594 days.

(21) Appl. No.: 13/147,336

(22) PCT Filed: Jan. 15, 2010

(86) PCT No.: PCT/JP2010/050744
§ 371 (c)(1),
(2), (4) Date: Aug. 1, 2011

(87) PCT Pub. No.: WO2010/087274
PCT Pub. Date: Aug. 5, 2010

(65) Prior Publication Data
US 2011/0285595 A1    Nov. 24, 2011

(30) Foreign Application Priority Data

Feb. 2, 2009  (JP) .................................. 2009-021567

(51) Int. Cl.
H01Q 1/24    (2006.01)
H01Q 1/08    (2006.01)
H04M 1/02    (2006.01)

(52) U.S. Cl.
CPC ................ *H01Q 1/244* (2013.01); *H01Q 1/08* (2013.01); *H04M 1/0237* (2013.01); *H04M 1/026* (2013.01)
USPC .......................................... 343/702; 343/729

(58) Field of Classification Search
USPC .................. 343/702, 729, 895, 724; 455/566, 455/575.4, 575.7
See application file for complete search history.

(56) References Cited

U.S. PATENT DOCUMENTS

| 5,990,839 | A | 11/1999 | Schefte et al. |
| 6,208,874 | B1 | 3/2001 | Rudisill et al. |
| 7,904,126 | B2* | 3/2011 | Kim et al. ................... 455/575.4 |
| 8,554,291 | B2* | 10/2013 | Takagi ........................ 455/575.4 |
| 2003/0160726 | A1* | 8/2003 | Grant et al. ................... 343/702 |
| 2004/0090386 | A1* | 5/2004 | Shimabara et al. ........... 343/702 |

(Continued)

FOREIGN PATENT DOCUMENTS

FR    2802046 A1    6/2001
JP    3-175826 A    7/1991

(Continued)

OTHER PUBLICATIONS

European search report for EP10735743 dated Dec. 6, 2012.

(Continued)

*Primary Examiner* — Thien M Le
(74) *Attorney, Agent, or Firm* — Sughrue Mion, PLLC

(57) ABSTRACT

An electronic apparatus capable of thinning and miniaturizing without causing degradation of antenna characteristics and impairment of operability and its manufacturing method are provided. An electronic apparatus includes: an upper case; a lower case which is connected to the upper case so that the lower case can slide against the upper case; a storage unit placed on a face of the lower case side of the upper case; an antenna stored in the storage unit; and a slot placed on a face of the upper case side of the lower case, wherein the slot has a shape which can store at least part of the storage unit.

11 Claims, 10 Drawing Sheets

(56) References Cited

U.S. PATENT DOCUMENTS

| | | |
|---|---|---|
| 2005/0179602 A1 | 8/2005 | Ryu et al. |
| 2006/0097933 A1 | 5/2006 | Lee |
| 2006/0142073 A1* | 6/2006 | Gordecki ............... 455/575.4 |
| 2009/0033563 A1 | 2/2009 | Kanasaki et al. |
| 2010/0184493 A1* | 7/2010 | Lin et al. .............. 455/575.7 |

FOREIGN PATENT DOCUMENTS

| | | |
|---|---|---|
| JP | 7111472 A | 4/1995 |
| JP | 2001127516 A | 5/2001 |
| JP | 2001251111 A | 9/2001 |
| JP | 2006067361 A | 3/2006 |
| JP | 2006238271 A | 9/2006 |
| JP | 2008054274 A | 3/2008 |
| JP | 2008072382 A | 3/2008 |
| WO | 9845893 A1 | 10/1998 |
| WO | 0027041 A1 | 5/2000 |
| WO | 2006092979 A1 | 9/2006 |

OTHER PUBLICATIONS

International Search Report for PCT/JP2010/050744 mailed Feb. 16, 2010.

* cited by examiner

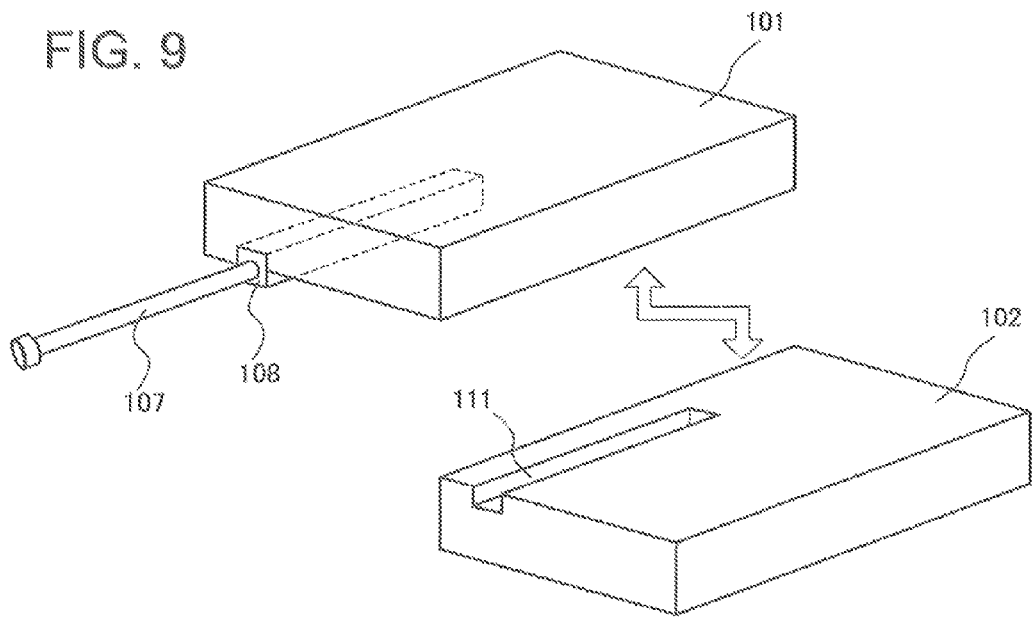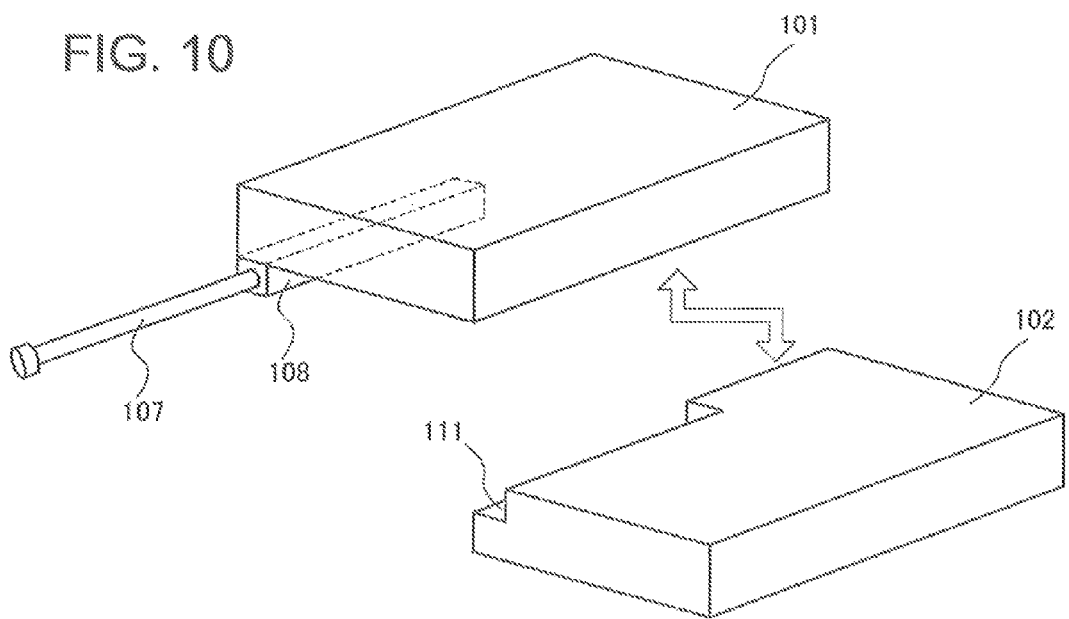

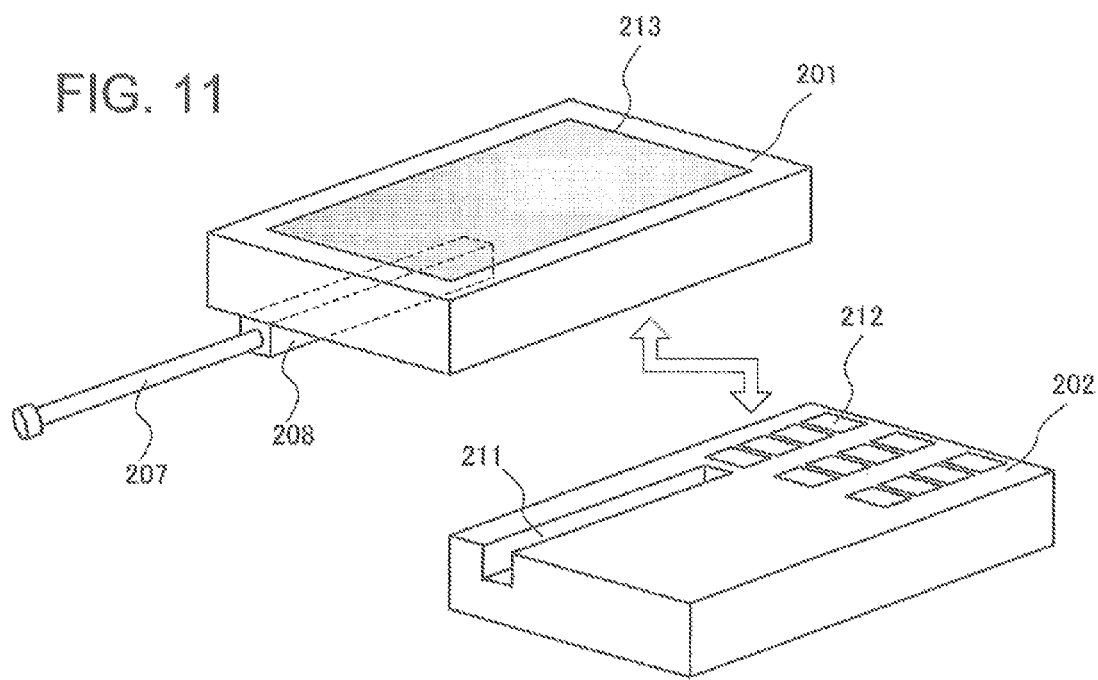

ELECTRONIC APPARATUS AND METHOD FOR MAKING THE SAME

TECHNICAL FIELD

The present invention relates to an electronic apparatus and method for making the same and, in particular, relates to an electronic apparatus which can be opened and closed by sliding and method for making the same.

BACKGROUND ART

In case of making a receiving function for digital television broadcast to be installed in a portable radio which can be opened and closed by sliding, it is general to install a whip antenna which can be stored in a case on the side of a lower case. The whip antenna is used for receiving the digital television broadcast.

In a structure of an electronic apparatus which can be opened and closed by sliding with a whip antenna on the side of a lower case, when the whip antenna is pulled out in a state of a case opened, the antenna element of the whip antenna approaches an upper case. It is known that, as a result, it is influenced by the upper case which works as ground, and the reception performance degrades.

Accordingly, as a measure to this phenomenon, it is considered to install a whip antenna on an upper case side.

However, in an electronic apparatus which can be opened and closed by sliding, a display device (such as Liquid Crystal Display (LCD) and organic electroluminescence (EL) display apparatus) is often loaded in an upper case. As a result, it is difficult to reserve a space which loads a whip antenna on an upper case from a view point of thinning and miniaturizing an electronic apparatus.

As a technology in relation to an electronic apparatus which can be opened and closed by sliding and which loaded an antenna in an upper case, there is "a mobile terminal apparatus" disclosed by patent literature 1. The mobile terminal apparatus disclosed by patent literature 1 extends the back of the upper end side of the upper case and provides an upper row part and a holding part. The mobile terminal apparatus has a structure which makes a lower case shorter than the upper case. Also, an antenna is placed in the upper row part.

However, when the lower case is made shorter than the upper case like an invention disclosed by patent literature 1, the distance that the upper case and the lower case can slide against each other becomes shorter. For this reason, when the upper and lower cases are opened, there was a problem that an exposed area of a front face of the lower case becomes smaller and operability of the electronic apparatus is impaired.

When the exposed area of the front face of the lower case becomes smaller, operability of the electronic apparatus is impaired. For example, when the exposed area becomes smaller, a surface area of the lower case which can be grasped becomes smaller, and the electronic apparatus becomes more difficult for a user to grasp. Also, it becomes necessary to make an operation unit such as a direction key and a numerical key mounted on a front face of the lower case small, or make a key pitch small, and operability of the electronic apparatus is impaired.

CITATION LIST

Patent Literature

Patent literature 1: Japanese Patent Application Laid-Open No. 2008-54274

SUMMARY OF INVENTION

Problems to be Solved by the Invention

Thus, an electronic apparatus: which is possible to be miniaturized and thinned; which can prevent degradation of antenna characteristics; and which can prevent impairment of operability; was not realized.

The present invention has been made in view of the problem, and the object of the present invention is to provide: an electronic apparatus which is possible to be miniaturized and thinned without causing degradation of antenna characteristics and impairment of operability which are problems mentioned above, and method for making the same.

Means for Solving the Problems

An electronic apparatus of the present invention includes: an upper case; a lower case which is connected to the upper case so that the lower case can slide against the upper case; a storage unit placed on a face of the lower case side of the upper case; an antenna stored in the storage unit; and a slot placed on a face of the upper case side of the lower case, wherein the slot has a shape which can store at least part of the storage unit.

Also a method for making an electronic apparatus of the present invention includes: forming a storage unit storing an antenna, in an upper case of an electronic apparatus; forming a slot storing at least part of the storage unit, in a lower case of the electronic apparatus, and facing the storage unit to the slot to connect the upper case and the lower case.

Effect of the Invention

According to the present invention, an electronic apparatus which is possible to be miniaturized and thinned without causing degradation of antenna characteristics and impairment of operability and; method for making the same can be obtained.

BRIEF DESCRIPTION OF THE DRAWINGS

FIG. 9 is a perspective view showing a structure of a portable radio according to the first embodiment of the present invention.

FIG. 10 is a perspective view showing a structure of a portable radio according to the first embodiment of the present invention.

FIG. 11 is a perspective view showing a structure of a portable radio according to the second embodiment of the present invention.

DESCRIPTION OF EMBODIMENTS

In the following, exemplary embodiments according to the present invention will be described based on drawings.

(The First Exemplary Embodiment)

Figure 1A:
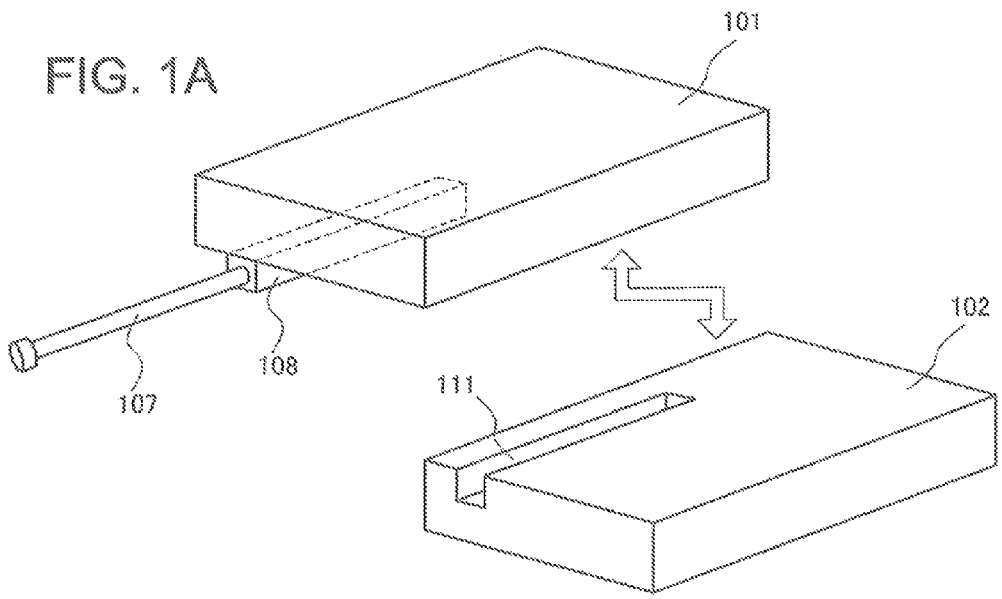
FIG. 1A is a figure showing a structure of an electronic apparatus according to the first exemplary embodiment of the present invention.
Figure 1B:
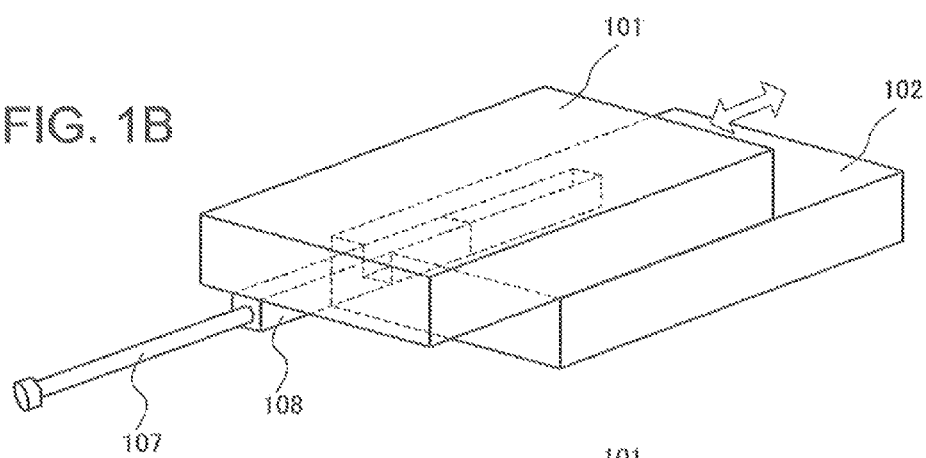
FIG. 1B is a figure showing a structure of an electronic apparatus according to the first exemplary embodiment of the present invention.

As shown in FIG. 1A and FIG. 1B, an electronic apparatus according to the first exemplary embodiment is a sliding electronic apparatus where a upper case 101 and a lower case 102 are connected possible to slide. The upper case 101 includes a storage unit 108, which is installed approximately in parallel to a sliding direction and projecting on a back side, and a whip antenna 107 which can be stored in the storage unit 108. A slot 111, which can place the storage unit 108, is formed on a front face of the lower case 102. The storage unit 108 is placed in the slot 111 in a state where the upper and lower cases are closed.

By making a structure in such a way, it becomes possible to prevent degradation of antenna characteristics of a whip antenna without increasing a thickness dimension in a state where the upper and lower cases are closed and to secure a large exposed area of a front face of the lower case in a state where the upper and lower cases are opened.

Figure 1C:
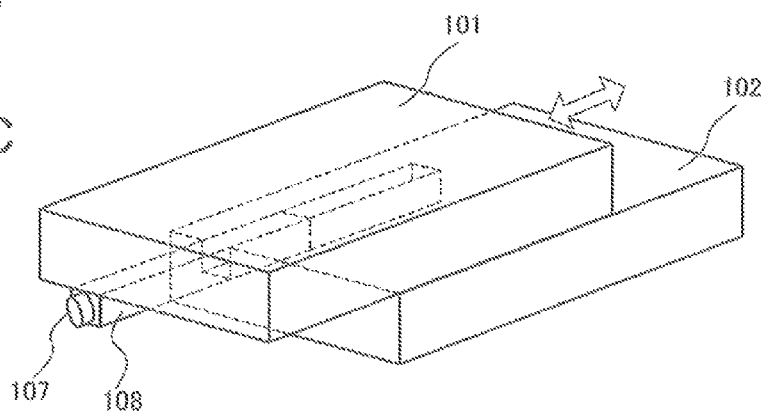
FIG. 1C is a figure showing a structure of an electronic apparatus according to the first exemplary embodiment of the present invention.

The first exemplary embodiment will be described in more detail. An electronic apparatus according to the first exemplary embodiment is shown in FIG. 1A, FIG. 1B and FIG. 1C. FIG. 1A indicates an electronic apparatus which separates an upper case and a lower case for the purpose of description. FIG. 1B indicates one in a state where the upper case and the lower case of the electronic apparatus shown in FIG. 1A arc connected. FIG. 1C indicates one which is the electronic apparatus shown in FIG. 1B and is in a state where an antenna is stored in a storage unit.

As shown in FIG. 1A and FIG. 1C, an electronic apparatus according to the first exemplary embodiment includes a upper case 101, a lower case 102 which is connected to the upper case 101, a storage unit 108 placed on a face of the lower case side of the upper case 101, a antenna 107 stored in the storage unit 108 and a slot 111 placed on a face of the upper case side of the lower case 102. As shown in FIG. 1B, the lower case 102 can slide against the upper case 101. The slot 111 includes a shape which can accommodate at least part of the storage unit 108.

In an electronic apparatus of the first exemplary embodiment, a connected state in which an upper case and a lower case are connected can take states of both short length and long length by sliding the upper case against the lower case. A state of short length indicates a state that the length of the connected state in a sliding direction is short. A state of long length indicates a state where the length of the connected state in a sliding direction is longer than the state of short length. Also, the state of short length is called as a state with slide closed. On the other hand, the state of long length is also called as a state when the upper and lower cases are opened. The state of short length and the state of long length can be exchanged by sliding an upper case or a lower case against each other.

In an electronic apparatus of this exemplary embodiment, by placing the storage unit 108 which stores antenna 107 on upper case 101, when the antenna 107 is pulled out, it is possible to prevent an antenna element from approaching the upper case 101 which is in a danger of functioning as a ground. Accordingly, by placing storage unit 108 in this way, degradation of antenna characteristics can be prevented.

Furthermore, in an electronic apparatus of this exemplary embodiment, the storage unit 108 is placed on a face of the lower case 102 side of the upper case 101, and the slot 111 which can hold the storage unit 108 is placed on a face of the upper case side of the lower case 102. And slot 111 has a shape which can accommodate at least part of the storage unit 108. Accordingly, the storage unit 108 can be placed in the slot 111. As a result, thinning and miniaturization of the electronic apparatus can be achieved.

Furthermore, in an electronic apparatus of this exemplary embodiment, because it is enough for the slot 111 placed in the lower case 102 to have a size that can place the storage unit 108, a face of the upper case side of the lower case 102 can be used effectively. Because the mobile terminal apparatus described in patent literature 1 was made to have a structure that extends the back of the upper end side of an upper case to the direction of thickness of the upper case and places an antenna in the extended part, it was necessary for the lower case to be made shorter in the longitudinal direction than the upper case. For this reason, in a state of long length, an exposed area of a face of the upper case side of the lower case becomes small, and operability of the mobile terminal apparatus has been impaired. On the other hand, in an electronic apparatus of this exemplary embodiment, because it is enough to install the slot 111 with a size which can place the storage unit 108 on the upper case side of the lower case 101, it is not necessary to make the length of the lower case in the longitudinal direction shorter. Therefore, for example, it is possible to make the length of the longitudinal direction, which is the sliding direction, of the upper case 101 and the length of the longitudinal direction of the lower case 102 equal. As a result, when the upper case 101 and the lower case 102 are in a state of long length, an exposed area of a face of the upper side of the lower case 102 can be made larger, and operability of the electronic apparatus can be improved. For example, by making the exposed area of the face of the lower case 102 on the upper case side large, it becomes easy to grasp the lower case 102. Also, an operation unit such as a direction key or a numerical key can be placed on the face of the upper case side of the lower case 102, and operability of the electronic apparatus can be improved.

By making the electronic apparatus in this exemplary embodiment be structured as mentioned above, degradation of antenna characteristics of an antenna and impairment of operability can be prevented, and further, miniaturization and thinning of the electronic apparatus can be realized.

It is desirable to make the antenna 107 have a structure that can be stored in the storage unit 108. By making it have such a structure, a part projecting from a periphery of a case can be reduced, and the electronic apparatus can be made to have the structure easy to carry.

It is desirable that a tip part of the antenna 107 is placed on a side face of the storage unit 108 in the direction where the case slides. By making it have such a structure, the antenna 107 can be pulled out from the storage unit 108 easily.

One of side faces of the storage unit 108 in the direction where the lower case slides against the upper case is desired to be place on the edge of the upper case 101 in the direction where it slides. By making it have such a structure, the antenna 107 can be pulled out from storage unit 108 easily.

It is desirable that the storage unit 108 stores the antenna 107 only. As far as it can be placed in the slot 111, the storage unit 108 can take an arbitrary shape. Accordingly, by making the storage unit 108 take the shape that stores the antenna 107 only, it becomes possible to make the slot 111 smaller. As a result, an exposed area of a face of the upper case side of the lower case 102 becomes larger, and operability of the electronic apparatus can be improved.

The storage unit 108 can be placed so that the longitudinal direction of the storage unit 108 is approximately in parallel to the direction where the lower case 102 slides against the upper case 101.

The storage unit 108 can store those other than the antenna. The size of the storage unit 108 can be changed according to the size of those stored. Furthermore, when the size of the storage unit 108 is changed, it is desirable to change the size of the slot according to the size of the storage unit.

The shape of the storage unit 108 may be made cylindrical.

As shown in FIG. 9, at least a part of the storage unit 108 may be placed inside the upper case 101. For example, a part of the storage unit 108 in the thickness direction can be placed inside the upper case 101. Also, as shown in FIG. 1A, a whole body of the storage unit 108 may be placed on the surface of the upper case.

In an electronic apparatus shown in FIG. 1A-FIG. 1C, although the upper case 101 and the lower case 102 can be made to have the same shape, they may be made in different shapes.

The lower case 102 can be made to take a structure which slides against the upper case 101 for the distance approximately equal to the length of the lower case 102 in the longitudinal direction. By making it to have such a structure, an exposed area of a face of the upper case side of the lower case 102 can be increased, and operability of the electronic apparatus can be improved.

As shown in FIG. 10, the slot can be made to have a structure to be placed at the end in the direction of short length of the lower case. When the slot is placed in such a way, it is desirable to place a storage unit at the end in the direction of short length of the upper case.

It is desirable to use an omni-directional antenna such as a rod antenna or a whip antenna for the antenna.

In the description mentioned above, in an electronic apparatus in this exemplary embodiment, although it was explained that a lower case is made to slide against an upper case, this means that the upper case and the lower case are made to slide against each other. Accordingly, it is understood that an electronic apparatus which makes an upper case slide against a lower case is also included in this case.

The related invention disclosed by patent literature 1 removes restriction of a space for setting up an antenna by placing the antenna in the upper row part of the upper end side of the back of the upper case. However, when the lower case is made shorter than the upper case, the distance that the upper case and the lower case can slide against each other becomes shorter. For this reason, an electronic apparatus which has a distance that an upper case and a lower case can slide against each other sufficiently and is loaded with an antenna in the upper case has not been realized.

The problem mentioned above can be settled by an electronic apparatus according to this exemplary embodiment. An electronic apparatus according to this exemplary embodiment can prevent degradation of antenna characteristics of a whip antenna without increasing a thickness dimension in a state where the upper and lower cases are closed, and secure a large exposed area of a front face of a lower case in a state when the upper and lower cases are opened.

A method for making an electronic apparatus according to this exemplary embodiment will be described below. A storage unit which can include an antenna is formed in an upper case which composes an electronic apparatus. Also, a slot which can accommodate at least part of the storage unit is formed in a lower case which composes the electronic apparatus. And the upper case and the lower case are connected by opposing the storage unit to the slot.

(The Second Exemplary Embodiment)

Next, an electronic apparatus according to the second exemplary embodiment will be described using FIG. 2-FIG. 9. Below is an exemplary embodiment in case an electronic apparatus is a portable radio and a whip antenna is for receiving digital television broadcast.

Figure 2:
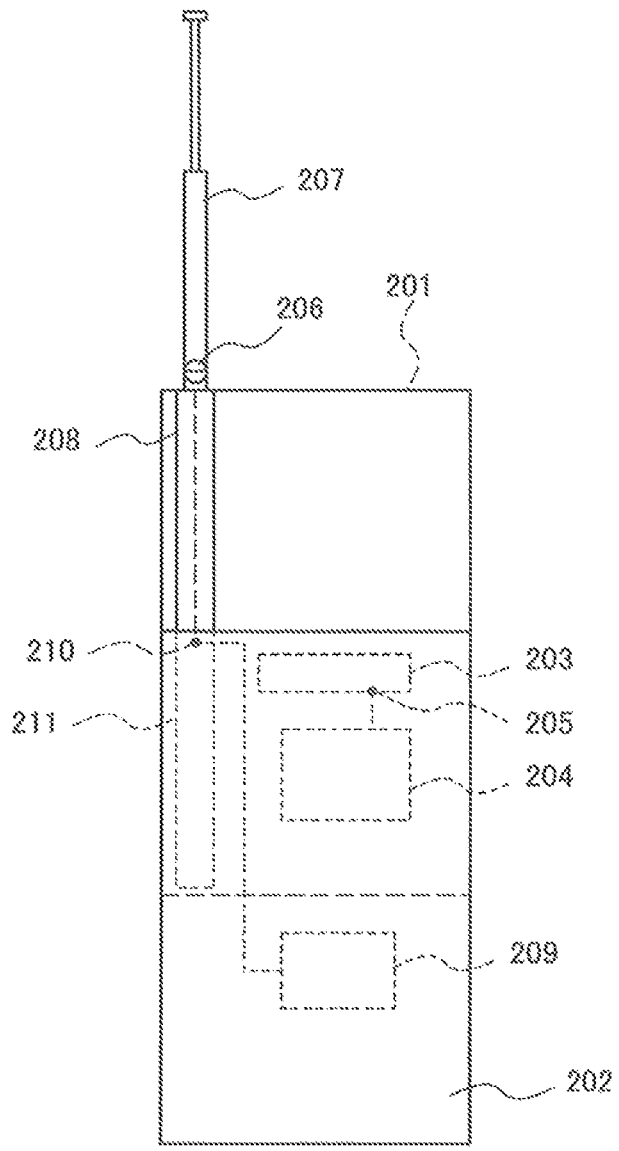
FIG. 2 is a plan view showing a portable radio according to the second exemplary embodiment of the present invention in a state of long length.
Figure 3:
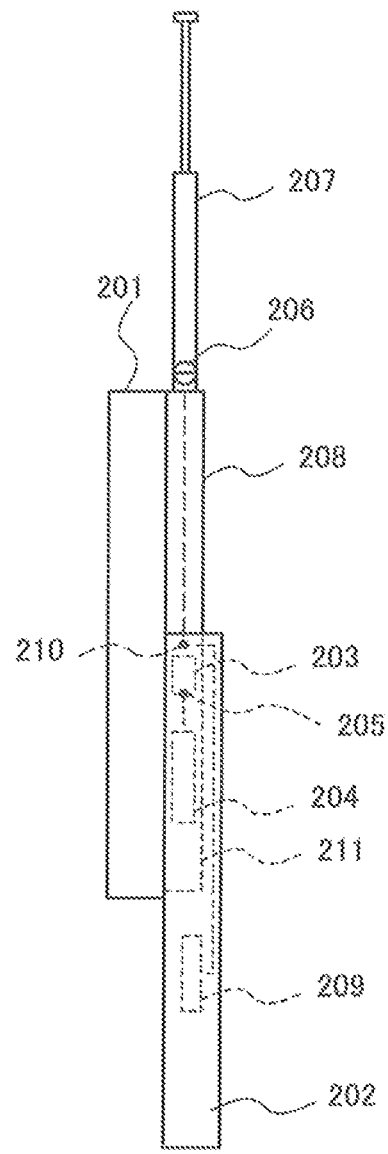
FIG. 3 is a side view showing a portable radio according to the second exemplary embodiment of the present invention in a state of long length.
Figure 4:
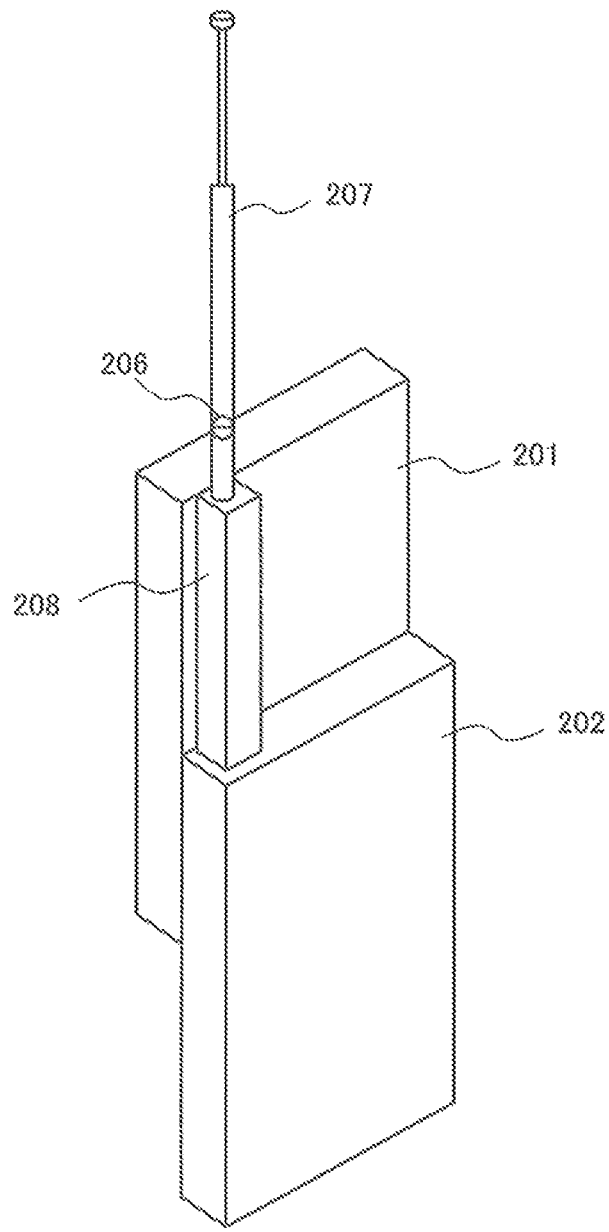
FIG. 4 is a perspective view showing a portable radio according to the second exemplary embodiment of the present invention in a state of long length.
Figure 5:
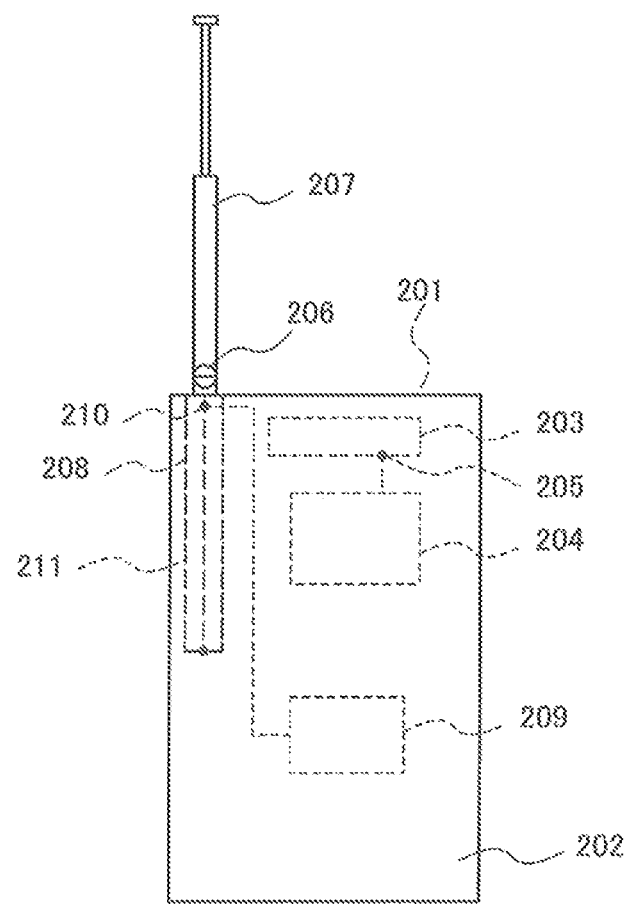
FIG. 5 is a plan view showing a portable radio according to the second exemplary embodiment of the present invention in a state of short length.
Figure 6:
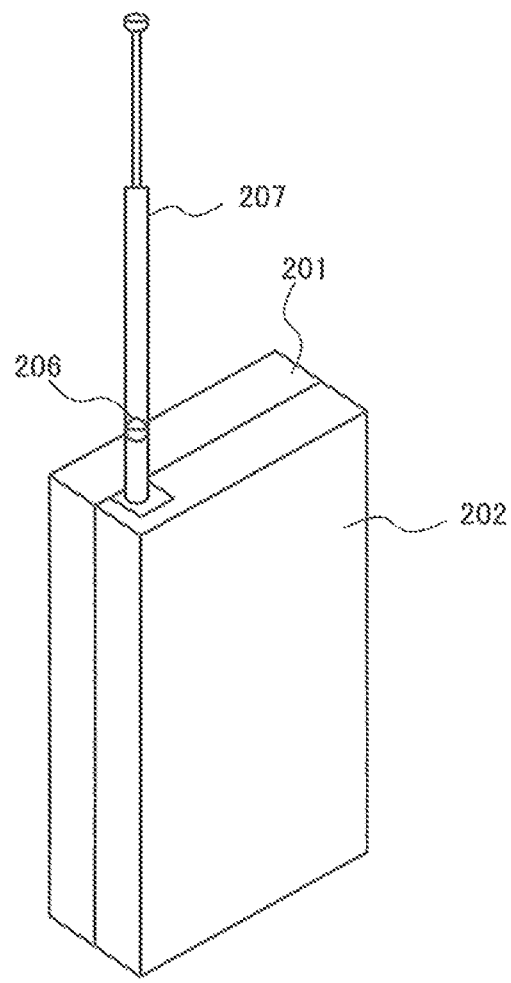
FIG. 6 is a perspective view showing a portable radio according to the second exemplary embodiment of the present invention in a state of short length.
Figure 7:
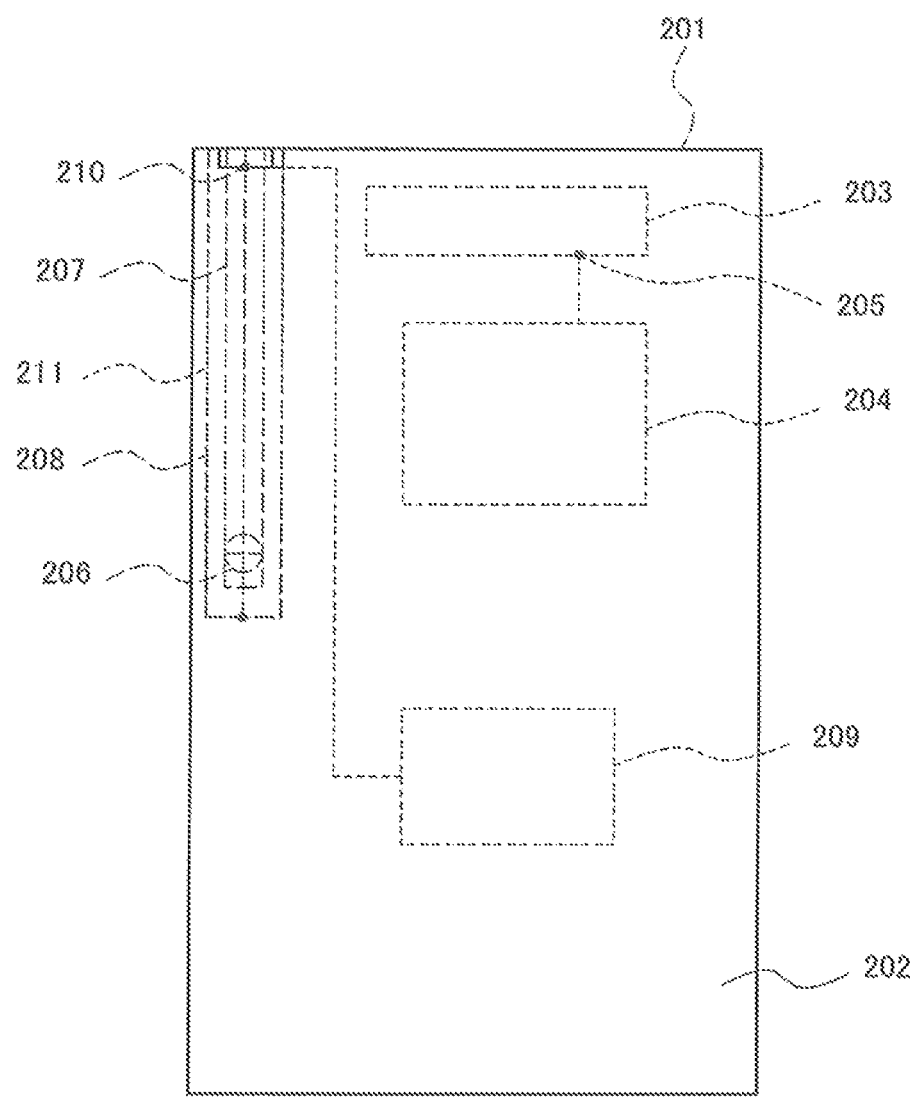
FIG. 7 is a plan view showing a portable radio according to the second exemplary embodiment of the present invention in a state of short length and further in a state of storing an antenna.
Figure 8:
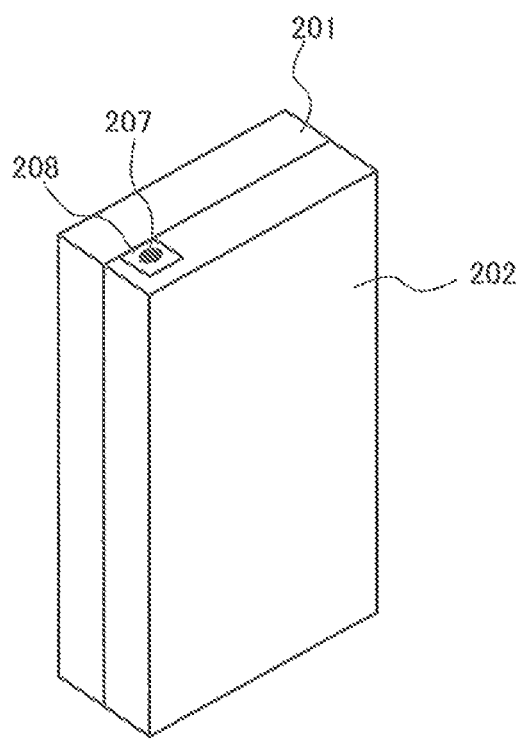
FIG. 8 is a perspective view showing a portable radio according to the second embodiment of the present invention in a state of short length and further in a state of storing an antenna.

FIG. 2-4 are a plan view, a side view and perspective view showing a portable wireless device in a state of long length according to this exemplary embodiment. Furthermore, FIG. 5-6 are a plan view and a perspective view showing a portable wireless device in a state of short length according to this exemplary embodiment. Furthermore, FIG. 7-8 are a plan view and an perspective view showing a portable wireless device in a state of short length and storing an antenna according to this exemplary embodiment.

As shown in FIG. 2-FIG. 4, a portable wireless device according to this exemplary embodiment has a structure where an upper case 201 and a lower case 202 are connected so that they can open and close by sliding.

A slot 211 which has a shape corresponding to a storage unit 208 is placed on a front side of the lower case 202. A wireless circuit 204 for processing wireless communication signals and a reception circuit 209 for processing digital television broadcast signals are installed inside the lower case 202. As shown in FIG. 3, a wireless communication antenna 203 is installed in the vicinity of an upper end of the lower case 202. The wireless communication antenna 203 is connected via a electric supply unit 205 to the wireless circuit 204 installed in the lower case 202 as shown in FIG. 2, by which the wireless device can transmit and receive a wireless signal. The wireless communication antenna 203 can be a multiband antenna corresponding to a plurality of bandwidths or can also be a single band antenna corresponding to only one bandwidth.

A whip antenna 207 for receiving digital television broadcast is installed on the back side of the upper case 201, and the whip antenna 207 can be stored in the storage unit 208 projecting on the back side of the upper case 201. The storage unit 208 is placed so that the longitudinal direction of the storage unit is along the sliding direction of the upper case 201 and the lower case 202.

The whip antenna 207 can be pulled out from the storage unit 208 in the direction where the upper case 201 or the lower case 202 slides. Also, the whip antenna 207 is extensible and contractive. Furthermore, the whip antenna 207 can be bent to an arbitrary direction at a bendable unit 206. The whip antenna 207 is connected to the reception circuit 209 installed in the lower case 202 via the storage unit 208 and a electric supply unit 210, and converts a wireless signal received as a digital television broadcasting wave into an electric signal and outputs it to the reception circuit 209.

By pulling out the whip antenna 207 from the storage unit 208, either in a state of long length shown in FIG. 2, FIG. 3 and FIG. 4 or in a state of short length shown in FIG. 5 and FIG. 6, the whip antenna 207 will be in a state where it does not overlap with either of the upper case 201 or the lower case 202 in the front-back direction, that is, in a thickness direction of the upper case. That is, an antenna element of the whip antenna 207 pulled out is in a state where it is apart from either of the upper case 201 or the lower case 202. Accordingly, in the portable wireless device of this exemplary embodiment, antenna characteristics of the whip antenna 207 neither undergo influence of the upper case 201 or the lower case 202, nor degrade.

Also, as shown in FIG. 5 and FIG. 6, in a state of short length, since the storage unit 208 is placed in the slot 211, though the storage unit 208 projects on a back side of the upper case 201, a thickness of the whole equipment in a state of short length can not increase. Accordingly, thinning of the portable wireless device cannot be prevented. Also, as shown in FIG. 7 and FIG. 8, since a part projecting from a periphery of the case disappears by storing the whip antenna 7 in the storage unit 208, it will not become an obstacle to carry the device.

Also, it is possible to make the upper case 201 and the lower case 202 almost in the same shape and to make a structure in which they overlap almost completely in a state of short length. Accordingly, in a state of long length, a large exposed area of a front face of the lower case can be secured. Accordingly, there are no cases where operability of the operation unit is impaired.

As described above, a portable wireless device according to this exemplary embodiment installs a storage unit which stores a whip antenna for receiving television in the back side of its upper case, and installs a slot with a shape corresponding to the storage unit on a front face of its lower case. As a result, by placing the storage unit in the slot, an increase in a thickness dimension in a state of short length can be prevented. Also, because the whip antenna is installed in the upper case in either state of long length or short length, it can be prevented for an antenna element of the antenna to approach the upper case or the lower case, and good antenna characteristics can be maintained. Furthermore, in a state of long length, a large exposed area of a front face of the lower case can be secured.

In the exemplary embodiments mentioned above, although a structure in which a circuit processing an electric signal which is converted by the whip antenna is installed in the lower case is taken as an example, this may be installed in the upper case.

Also, the use of the whip antenna is not limited to receiving a digital television broadcasting wave, and it may be for receiving radiobroadcast or for wireless communication.

As shown in FIG. 11, it is desirable to place a operation unit 212 on a face of the lower case on the upper case side. The operation unit 212 includes an operation key such as a direction key or a numerical key, or a touch panel and so on. In an electronic apparatus according to this exemplary embodiment, since an exposed area of a face of a lower case on an upper case side is large, that is, the area where an operation key can be placed is large, a key pitch of the operation keys can be made wider. As a result, an operation key which is easy to operate can be placed on the lower case.

As shown in FIG. 11, it is desirable to place a display unit 213 on a face of the upper case opposing to a face of the lower case side. Furthermore, the display unit 213 can be placed on a face of the lower case side of the upper case.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2009-021567, filed on Feb. 2, 2009, the disclosure which is incorporated herein in its entirety by reference.

Industrial Availability

The present invention can be applied to an electronic apparatus which can be opened and closed by sliding.

Description Of The Codes

101, 201 Upper case
102, 202 Lower case
103, 203 Wireless communication antenna
104, 204 Wireless circuit
105, 110, 205, 210 Electric supply unit
106, 206 Bendable unit
107 Antenna
108, 208 Storage unit
109, 209 Reception circuit
111, 211 Slot
207 Whip antenna
212 Operation unit
213 Display unit

The invention claimed is:

1. An electronic apparatus comprising:
an upper case;
a lower case which is connected to the upper case so that the lower case can slide against the upper case;
a storage unit placed on a face of the lower case side of the upper case;
an antenna stored in the storage unit; and
a slot placed on a face of the upper case side of the lower case, wherein
the slot has a shape which can store at least part of the storage unit.

2. The electronic apparatus according to claim 1, wherein a connected state, where the upper case connects to the lower case, takes a short length state where a length of the connected state in a sliding direction is short, and a long length state where the length is longer than a length of the short length state, by sliding the lower case against the upper case, and
the storage unit is placed in the slot when the connected state takes the short length state.

3. The electronic apparatus according to claim 1 further comprising an operation unit which is placed on a face of the upper case side of the lower case.

4. The electronic apparatus according to claim 1 further comprising a processing circuit installed in the lower case, the processing circuit processing a signal transmitted or received via the antenna, wherein the antenna is connected to the processing circuit via the storage unit.

5. The electronic apparatus according to claim 1, wherein the antenna is any one of a whip antenna and a rod antenna.

6. The electronic apparatus according to claim 1, wherein the antenna receives digital television broadcast.

7. The electronic apparatus according to claim 1, further comprising a display unit placed in the upper case.

8. The electronic apparatus according to claim 1, further comprising a second antenna being different from the antenna and being placed inside the lower case.

9. The electronic apparatus according to claim 8, wherein the second antenna is used for wireless Communication.

10. The electronic apparatus according to claim 1, wherein the storage unit has a shape for storing the antenna only.

11. A method for making an electronic apparatus comprising: forming a storage unit storing an antenna, in an upper case of an electronic apparatus;
- forming a slot storing at least part of the storage unit, in a lower case of the electronic apparatus, and
- facing the storage unit to the slot to connect the upper case and the lower case.

* * * * *